United States Patent
Allen et al.

(10) Patent No.: US 12,522,528 B2
(45) Date of Patent: Jan. 13, 2026

(54) MULTISTAGE BIOFILTER FOR REMOVAL OF MICROPLASTIC PARTICULATES AND BIOCHEMICAL WASTE FROM AQUACULTURE WATER

(71) Applicant: CLEAN VALLEY BIO-FILTRATION TECHNOLOGIES CIC, Dartmouth (CA)

(72) Inventors: Damir Allen, Dartmouth (CA); Hunter Bishop, Dartmouth (CA); Gregory English, Dartmouth (CA); Mitchell Hewitt, Dartmouth (CA); Kaycie Lane, Dartmouth (CA); Nicholas H. Lavalle, Dartmouth (CA); Anthony Edmonds, Dartmouth (CA); Zachary Delong, Dartmouth (CA)

(73) Assignee: Clean Valley Bio-filtration Technologies CIC, Dartmouth (CA)

( * ) Notice: Subject to any disclaimer, the term of this patent is extended or adjusted under 35 U.S.C. 154(b) by 0 days.

(21) Appl. No.: 17/998,854

(22) PCT Filed: May 18, 2021

(86) PCT No.: PCT/CA2021/050676
§ 371 (c)(1),
(2) Date: Nov. 15, 2022

(87) PCT Pub. No.: WO2021/232151
PCT Pub. Date: Nov. 25, 2021

(65) Prior Publication Data
US 2023/0192520 A1 Jun. 22, 2023

(51) Int. Cl.
*C02F 3/32* (2023.01)
*A01K 61/54* (2017.01)
(Continued)

(52) U.S. Cl.
CPC .............. *C02F 3/327* (2013.01); *A01K 61/54* (2017.01); *A01K 63/04* (2013.01); *C02F 1/001* (2013.01);
(Continued)

(58) Field of Classification Search
CPC .......... C02F 3/327; C02F 1/001; C02F 3/322; C02F 2103/20; C02F 2301/046;
(Continued)

(56) References Cited

U.S. PATENT DOCUMENTS 4,137,868 A * 2/1979 Pryor .................... A01K 61/00
                                                        119/212
8,101,080 B2    1/2012 Robinson et al.
(Continued)

FOREIGN PATENT DOCUMENTS

CN    105399286 A *  3/2016 ................ C02F 9/00
JP    2014023488 A *  2/2014

OTHER PUBLICATIONS

Machine-generated English translation of CN 105399286, generated on Mar. 16, 2016.*

(Continued)

*Primary Examiner* — Fred Prince
(74) *Attorney, Agent, or Firm* — Jeff Sun; McCarthy Tétrault LLP

(57) ABSTRACT

A water filtration system and corresponding method for removing particulate waste and biochemical waste from water is provided. The system includes a first compartment containing algae in liquid suspension. The algae is usable to agglomerate to the particulate waste and biochemical waste to form algal particulates in the water. The water and agglomerated algal particulates are provided to a second compartment through a fluid transfer conduit. The second compartment includes a set of suspension assemblies, each
(Continued)

of the suspension assemblies contain bivalves usable to siphon the algal particulates from the water.

16 Claims, 4 Drawing Sheets

(51) Int. Cl.
*A01K 63/04* (2006.01)
*C02F 1/00* (2023.01)
*C12N 1/12* (2006.01)
*C02F 103/20* (2006.01)

(52) U.S. Cl.
CPC ............. *C12N 1/12* (2013.01); *C02F 3/322* (2013.01); *C02F 2103/20* (2013.01); *C02F 2301/046* (2013.01); *Y02A 40/81* (2018.01)

(58) Field of Classification Search
CPC .......... A01K 61/54; A01K 63/04; C12N 1/12; Y02A 40/81
USPC ......... 210/602, 259, 260, 903, 906; 119/234
See application file for complete search history.

(56) References Cited

U.S. PATENT DOCUMENTS

| | | |
|---|---|---|
| 8,372,632 B2 | 2/2013 | Kertz |
| 8,753,851 B2 | 6/2014 | Stephen et al. |
| 2005/0115893 A1 | 6/2005 | Brune et al. |
| 2013/0180461 A1* | 7/2013 | Fujiyoshi ............... A01K 61/54 |
| | | 119/234 |
| 2014/0041596 A1* | 2/2014 | Fujiyoshi ............... A01K 61/55 |
| | | 119/236 |

OTHER PUBLICATIONS

Machine-generated English translation of JP 2014023488, generated on Mar. 16, 2016.*

Lance W Riley, "Freshwater clams as a treatment mechanism for phosphorus in agricultural wastewater", ISBN 978-1-124-28455-2, Publ. Jan. 1, 2018, XP055339587.

Shpigel Muki et al., "A biomechanical filter for treating fish-pond effluents", Aquaculture, Amsterdam, NL, vol. 152, No. 1-4, publ. Jan. 6, 2017, XP093144620.

* cited by examiner

MULTISTAGE BIOFILTER FOR REMOVAL OF MICROPLASTIC PARTICULATES AND BIOCHEMICAL WASTE FROM AQUACULTURE WATER

FIELD OF INVENTION

The present disclosure relates generally to water treatment, and more particularly to biofiltration of microplastic particulates and biochemical waste from water, such as aquaculture water.

BACKGROUND

Protecting the ocean and other water sources is of importance for the continued global exploitation of their resources and utilizing the potential for sustainable practices such as aquaculture. Currently, marine microplastics pose a significant concern to overall ocean health and are found throughout the world's oceans (Van Cauwenberghe & Janssen 2014).

The ingestion of these microplastic particles has been shown to occur in several marine organisms, including bivalves such as the blue mussel (*Mytilius edulis*). In bivalves, ingested microplastics are present in the soft tissue. Lab testing has found that the average concentration of microplastic particles in the bivalves to be 0.36 particles per gram of soft tissue (wet weight). This ingestion of microplastics by various marine species can pose a potential threat to consumers of seafood raised in open-pen aquaculture settings, where market-sized fish are also at risk of microplastic ingestion (Van Cauwenberghe & Janssen 2014).

Nitrogenous and phosphorous waste production poses a challenge to the aquaculture industry as high concentrations of constituents such as ammonia, nitrate and phosphorous can have deleterious effects on both the environment and human health. When discharged to surface or ground waters, ammonia and phosphorus can increase algal growth, resulting in an increased presence of algal toxins and a decrease in oxygen content for other aquatic life. Nitrate poses a potential risk to human health, as high concentrations of nitrate in drinking water are of specific concern to infants, and a direct cause of methemoglobinemia (blue baby syndrome).

As such, there is a need for solutions for addressing or ameliorating at least some of the problems identified above.

SUMMARY OF THE DISCLOSURE

In general, the present specification describes a water filtration system for removing microplastic particles and biochemical waste from water, such as aquaculture water in an aquaculture facility. As explained below, the filtration system includes a biofilter containing a combination of bivalve and algae distributed within different filtration stages of the filtration system.

According to a first broad aspect of the invention, there is provided a water filtration system for removing particulate waste and biochemical waste from water, the system comprising: a first compartment containing algae in liquid suspension, the algae being usable to agglomerate to the particulate waste and biochemical waste to form algal particulates in the water; a second compartment to receive the water and algal particulates from the first compartment through a fluid transfer conduit; and a set of suspension assemblies disposed within the second compartment, each of the suspension assemblies containing bivalves usable to siphon the algal particulates from the water.

According to another aspect of the invention, there is provided the water filtration system of the preceding paragraph comprising a third compartment containing a mesh filter for removing a portion of the particulate waste from the water to produce pre-treated water, the pre-treated water being provided to the first compartment through a second fluid transfer conduit.

According to another aspect of the invention, there is provided the water filtration system of one or more of the preceding paragraphs comprising a fourth compartment to receive water and algal particulates from the second compartment through a third fluid transfer conduit, the fourth compartment comprising a second set of suspension assemblies, each of the second set of suspension assemblies containing bivalves usable to siphon the algal particulates from the water.

According to another aspect of the invention, there is provided the water filtration system of one or more of the preceding paragraphs comprising a fluid recirculation conduit to recirculate a portion of the water and algal particulates from the fourth compartment to the third compartment.

According to another aspect of the invention, there is provided the water filtration system of one or more of the preceding paragraphs comprising a fluid recirculation conduit to recirculate a portion of the water and algal particulates from the fourth compartment to the first compartment.

According to another aspect of the invention, there is provided the water filtration system of one or more of the preceding paragraphs, wherein the first compartment comprises at least one baffle structure to contain the algae within the first compartment.

According to another aspect of the invention, there is provided the water filtration system of one or more of the preceding paragraphs, wherein the algae and bivalve correspond to respective algae species and bivalve species local to a geographical location of the system.

According to another aspect of the invention, there is provided the water filtration system of one or more of the preceding paragraphs, wherein the algae species is nutritious for the bivalve species used the filtration system.

According to another aspect of the invention, there is provided the water filtration system of one or more of the preceding paragraphs, wherein a selection of the algae and bivalve species is based on at least one of: (i) bivalve siphoning rate; (ii) bivalve siphoning range; (iii) bivalve survivability against a pump; (iv) bivalve lifespan; (v) algae agglomeration with nitrogen; (vi) algae agglomeration with ammonia; and (vii) algae agglomeration with the particulate waste.

According to another aspect of the invention, there is provided the water filtration system of one or more of the preceding paragraphs, wherein the bivalves are one of *Crassostrea virginica* and *Mytilus edulis*, and the algae is phytoplankton.

According to another aspect of the invention, there is provided the water filtration system of one or more of the preceding paragraphs, wherein the bivalves are *Mytilus edulis* and the algae is *Isochrysis* sp.

According to another aspect of the invention, there is provided the water filtration system of one or more of the preceding paragraphs, comprising 200 *Mytilus edulis* bivalves and 2 L of *Isochrysis* sp.

According to a second broad aspect of the invention, there is provided a method of filtering water to remove particulate waste and biochemical waste, the method comprising: providing a first filter containing algae in liquid suspension; directing water containing the particulate waste and biochemical waste to the first filter, wherein the algae in the first filter agglomerates to the particulate waste and biochemical waste to form algal particulates; and directing the water and algal particulate to a second filter containing bivalves usable to siphon the algal particulate from the water.

According to another aspect of the invention, there is provided the method of the preceding paragraph comprising directing the water containing the particulate waste and biochemical waste to a third filter containing a mesh filter prior to directing the water containing the particulate waste and biochemical waste to the first filter to pre-treat the water.

According to another aspect of the invention, there is provided the method of one or more of the preceding paragraphs comprising directing the water and algal particulate from the second filter to a fourth filter containing bivalves usable to siphon the algal particulate from the water.

According to another aspect of the invention, there is provided the method of one or more of the preceding paragraphs comprising recirculating a portion of the water and algal particulates from the fourth filter to the third filter.

According to another aspect of the invention, there is provided the method of one or more of the preceding paragraphs comprising recirculating a portion of the water and algal particulates from the fourth filter to the first filter.

According to another aspect of the invention, there is provided the method of one or more of the preceding paragraphs comprising establishing at least one baffle structure in the first filter to contain the algae within a first compartment of the first filter.

According to another aspect of the invention, there is provided the method of one or more of the preceding paragraphs, wherein the algae and bivalve correspond to a respective algae species and bivalve species combination local to a geographical location of the first filter and second filter.

According to another aspect of the invention, there is provided the method of one or more of the preceding paragraphs, wherein the algae species is nutritious for the bivalve species.

According to another aspect of the invention, there is provided the method of one or more of the preceding paragraphs comprising selecting the algae and bivalve species based on at least one of: (i) bivalve siphoning rate; (ii) bivalve siphoning range; (iii) bivalve survivability against a pump; (iv) bivalve lifespan; (v) algae agglomeration with nitrogen; (vi) algae agglomeration with ammonia; and (vii) algae agglomeration with the particulate waste.

According to another aspect of the invention, there is provided the method of one or more of the preceding paragraphs, wherein the bivalves are one of *Crassostrea virginica* and *Mytilus edulis*, and the algae is phytoplankton.

According to another aspect of the invention, there is provided the method of one or more of the preceding paragraphs, wherein the bivalves are *Mytilus edulis* and the algae is *Isochrysis* sp.

According to another aspect of the invention, there is provided the method of one or more of the preceding paragraphs comprising 200 *Mytilus edulis* bivalves and 2 L of *Isochrysis* sp.

Additional aspects of the present invention will be apparent in view of the description which follows.

BRIEF DESCRIPTION OF THE DRAWINGS

Features and advantages of the embodiments of the present invention will become apparent from the following detailed description, taken with reference to the appended drawings in which.

DETAILED DESCRIPTION

Figure 1:
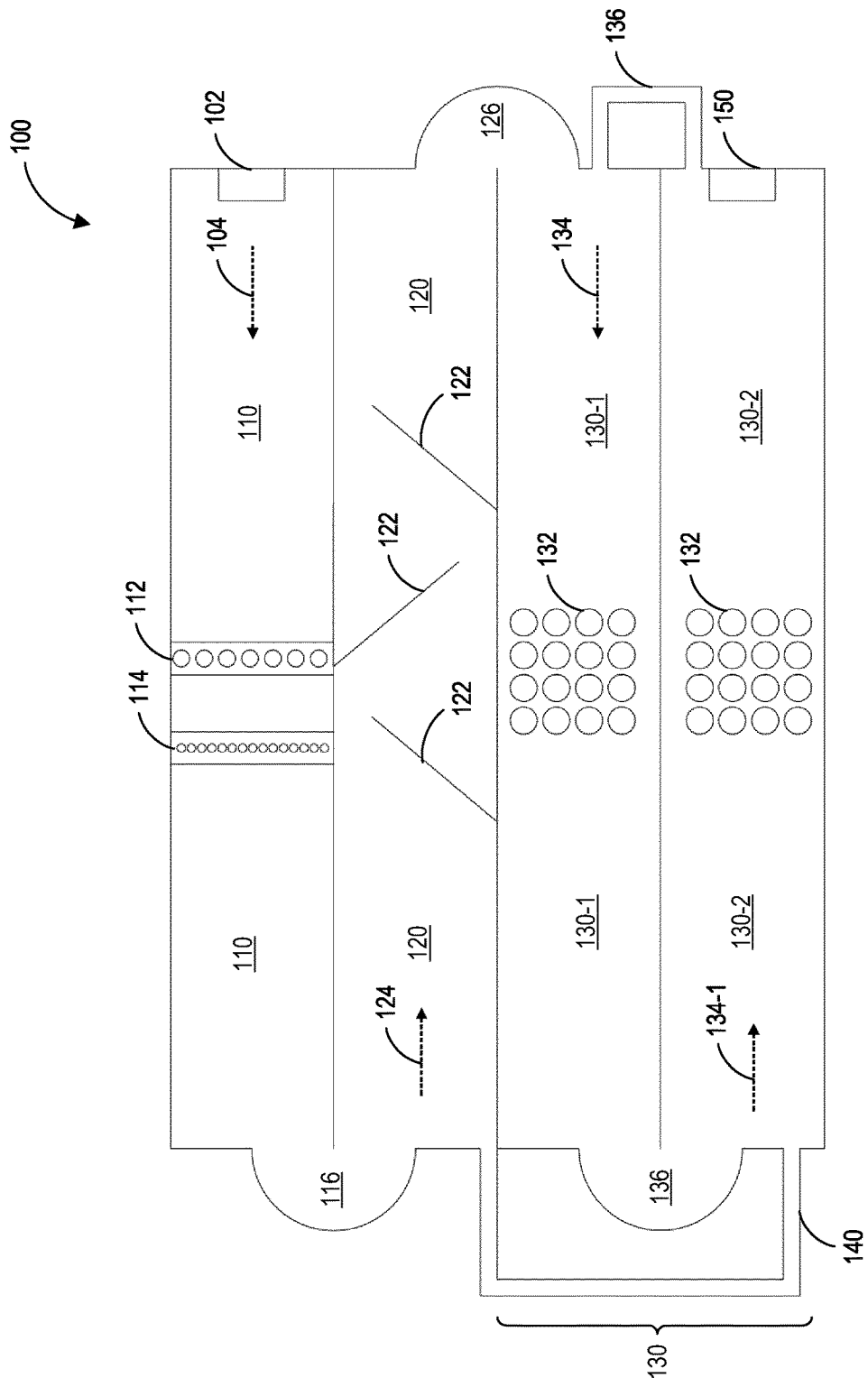
FIG. 1 is a schematic diagram of a water filtration system according to at least one embodiment.

The description which follows, and the embodiments described therein, are provided by way of illustration of examples of particular embodiments of the principles of the present invention. These examples are provided for the purposes of explanation, and not limitation, of those principles and of the invention.

The embodiments herein disclose an autonomous filtration system and corresponding method for removing particulates such as microplastic and biochemical waste such as, for example, nitrogenous and phosphorous waste (collectively the "contaminants") from aquaculture water in aquaculture facilities such as open-pen aquaculture facilities. It is also an intended objective that the disclosed filtration system be configurable or adaptable to operate in other similar operations within the fishing industry, including but not limited to, on-shore flow-through facilities, recirculating aquaculture systems (RAS), bivalve hatcheries, and finfish storage facilities. During use, water that contains contaminants may be passed through a biofilter provided in the filtration system. As described more fully below, the biofilter includes multiple stages of filtration, including an inorganic mesh filter, an algal biochemical filter, and a bivalve particulate filter. Water undergoing treatment may be circulated through the foregoing filtration stages in a particular order to maximize contaminant removal.

Implementing a filtration system which allows extractive species (e.g. algal biochemical filtration and bivalve particulate filtration) to filter the water, removing hazardous chemicals or materials in a similar fashion to land-based aquaculture facilities, gives open-pen aquaculture sites the opportunity to maintain pristine water conditions for optimal seafood growth and health. The use of such systems can improve influent water, by filtering out volatile organic compounds such as dioxins and furans, or harmful chemicals such as mercury, as well as remove larger particles that can cause environmental issues such as microplastics or sea lice (Webb et al. 2013). Filtration may also improve effluent water from an aquaculture site, solving a high profile environmental issue that society and many Non-Governmental Organizations (NGOs) have vocalized in relation to open-pen aquaculture. A system implemented at an off-shore or in-shore net pen, or at a land-based flow-through facility, could clear influent water of deleterious substances, while simultaneously aiding in the removal of hazardous by-products of the facility contained within the effluent. A system implemented at an on-shore RAS facility could provide clarification of biological contaminants produced by the facility's product, ensuring high water quality and therefore higher quality product.

The aquaculture industry provides an opportunity for the filtration abilities of bivalves in the form of nitrogenous waste removal. While many land-based facilities are able to remove solids, such as fecal matter, there is still a significant amount of dissolved nitrogenous compounds such as nitrate, nitrite and ammonium that can pose a risk to the health of cultured finfish. The combination with free-floating microalgae, which actively use these dissolved compounds for growth, bivalves such as *Mytilus edulis* can consume the algae and subsequently improve water quality. This is a method that has been proven to be effective in water remediation efforts (Gifford et al., 2004).

With growing populations and deteriorating oceanic conditions, the creation of an autonomous filtration system is useful for producing affordable, high quality seafood. Without the implementation of such a system, the aquaculture industry is likely to continue to arrive at a crossroads for expansion: take the risk in open-pen setups, where fish raised in such setups could be affected by the state of the environment and vice versa, or have a controlled land-based facility with much higher start-up and maintenance costs. Capital costs are important to consider when encouraging the expansion of this industry as the shift towards recirculating land-based systems, which can require upwards of US$50 Million, becomes more prevalent. A filter which utilizes extractive species may provide a new, cost effective technology that allows this industry to continue its sustainable growth.

Use of the disclosed biofilter system in open-pen farms for raising fish and other seafood is intended to improve the viability of open-pen expansion. Such use is intended to have lower deleterious effects on the environment, less likelihood of disease or parasites (i.e. sea lice), and lower energy usage, while still maintaining the significantly lower operating costs (up to €1.50/kg lower, based on Norwegian salmon farms) relative to their land-based counterparts (Intrafish 2018).

To expand on the definition of biochemical waste, according to Canadian legislation, the Fisheries Act defines a deleterious substance, in part, as ". . . any substance that, if added to any water, would degrade or alter or form part of a process of degradation or alteration of the quality of that water so that it is rendered or is likely to be rendered deleterious to fish or fish habitat or to the use by man of fish that frequent that water . . . ." Ergo deleterious substances may include microplastic particles due to the degradation and alterations it causes to fish and human health. Furthermore, deleterious substances may also include nitrogenous, phosphate, and other dissolved solids that are found in aquaculture effluent. For example, nitrogenous waste such as ammonia and nitrites in excess can be detrimental to the health of fish within the aquaculture system and similarly detrimental when discharged without any regard for its impact. Thus, it is a best practice of the aquaculture industry to dilute circulating water to keep nitrogenous compounds such as ammonia below a concentration of 0.5 mg/L or else face a die-off of fish within their system. Therefore, onshore aquaculture facilities respond to this challenge with dissolved solid biofilters that currently utilize bacteria as the primary state of nitrification and denitrification. What follows is naturally a more efficient alternative.

FIG. 1 shows a schematic diagram of a water filtration system 100 according to at least one embodiment of the invention. The filtration system 100 is operable as a self-sustaining system that circulates input water such as seawater through a number of filtration stages to reduce and/or eliminate potentially harmful components, providing improved water conditions for the culturing of seafood such as finfish along coastal areas. This system 100 is suited to remove harmful chemicals, microplastics and parasites such as sea lice. In the present embodiment, there are three main filtration stages disposed across multiple chambers or cells as described more fully below.

The cells of the filtration system 100 may be fabricated using any suitable methods or techniques. For example, the filtration system 100 may be a unitary body (e.g. a molded metallic or plastic body) comprising separate chambers separated using walls. In other implementations, the filtration system 100 may comprise of multiple separate containers connected using suitable tubing connecting each container.

The filtration system 100 includes a water inlet 102 for receiving input water containing contaminants (e.g. water containing microplastic and biochemical compounds for which removal is desired) to a first cell corresponding to a first filtration stage 110 of the water filtration system 100. The wastewater may be actively pumped from the aquaculture facility to the water inlet 102. The directional arrow labeled with reference numeral 104 indicates the direction of water flow. The first filtration stage 110 includes a sieve having pores of a suitable size. In the present embodiment, a primary fine mesh 112 and secondary fine mesh 114 are included for trapping or straining out larger particulates present in the water and any debris too large to be consumed by the organisms present in the biofilter in subsequent filtration stages. The size of this screen may vary based on the prevalence of large particulate matter in the location in which it is deployed. For example, in the present embodiment, pores in the size from 0.5 mm to 0.25 mm may be used. In some embodiments, pre-treatment of water using such a stage may be excluded if the input water is sufficiently free of large debris or that straining is conducted in a separate water pre-treatment step. Water exiting the first filtration stage 110 enters a first transfer conduit 116 that transfers water from the first filtration stage 110 to a second cell corresponding to a second filtration stage 120 of the system 100. In the present embodiment, a microalgae in liquid suspension is provided in the second filtration stage 120 that interacts with the contaminants in the wastewater similar to a coagulation process used in the treatment of conventional drinking water. More specifically, the algae, floating in liquid suspension, can adhere to or agglomerate with the particulates and other biochemical contaminants in the water as it flows in the direction shown by the directional arrow with reference numeral 124, forming larger algal particulates having sizes suitable for ingestion by bivalves disposed in a third filtration stage 130. In some embodiments, macroalgae can be used instead of microalgae. Alternatively, combinations of macroalgae and microalgae can be used. Algae may be sourced from any suitable location, having regard to any possible risks of introducing non-local invasive species. In some embodiments, high productivity monoculture algal cells can be utilized to improve growth and nutrient removal efficiency for the conditions of a given influent. Alternatively, more robust polycultures can provide advantages in situations where there may be multiple growth and removal parameters. The growth rate of the algae at the typical algal density during normal operation of the filtration system is sufficient to make up for losses from dilution and washout, thus maintaining algal density. The inventors have used macroalgae and microalgae sourced from Sober Island in Nova Scotia, Canada for utilization in their Benchmark and Alpha prototype tests.

Also shown in the second filtration stage 120 are baffle structures 122 which may be used in some embodiments to provide adhesion sites for the algae within the cell corresponding to the second filtration stage 120 and promote interaction between the contaminants in the water and the algal species. The algal species are therefore acting similar to a coagulant, usable to pull contaminant particles together into the algal cells so that when the algal cells are consumed by the bivalves in the subsequent filtration stages of the filtration system 100, the same bivalves also are consuming the contaminants and thereby removing such contaminants from the water.

The water undergoing filtration may be circulated out of the second filtration stage 120 to a third cell 130-1 corresponding to a third filtration stage 130 through a second transfer conduit 126 connecting the two stages. In the third filtration stage 130, the wastewater passes through a channel of bivalves hanging on one or more suspension assemblies 132. The direction of fluid flow is shown by the directional arrow indicated using reference numeral 134. The bivalve compartments are able to siphon (i.e. ingest or consume) the algae and associated particulates from the water in a process similar to clarification or sedimentation in a traditional drinking water treatment facility. More specifically, in the third filtration stage 130, the bivalves consume the algal cells transferred from the second filtration stage 120, thereby consuming the contaminants already absorbed by the algal cells. The bivalves are therefore usable to remove contaminants from the water. Additionally, bivalves can facilitate the deposition of nitrogenous waste to a substrate within the bioreactor, sequestering nitrogenous waste from the water column and allowing microorganisms to more readily initiate denitrification. Examples of bivalves include, but are not limited to, American Oysters and Blue Mussels, formally known as the *Crassostrea virginica* and *Mytilus edulis* respectively.

In the present embodiment, the suspension assembly 132 consists of removable bivalve hangers fabricated using a coarse substrate material attached to a mussel rack. These suspension assemblies facilitate the water flow over the bivalves, allowing more effective diversion of flow of water in a closer proximity to the bivalves. Examples of coarse material include a nylon netting which enables the bivalve to attach and hang from the rack. Bivalves are distributable vertically along the assembly 132 to provide siphoning at different depths. However, other methods of fabricating suspension assembly 130 can be used as appropriate. In the present embodiment, the bivalves used within the third filtration stage 130 can be native to the location of the aquaculture site. For example, the inventors have used bivalves that are local to Atlantic Canada, where an example filtration system 100 is established. Suitable local species of bivalve can be used based on the location of the filtration system 100 to avoid any introduction of invasive non-local species of bivalves. This flexible principle in species selection may also be applied when selecting the algal species to be used, ensuring that the least invasive, most efficient species are chosen based on the site location of deployment of the filtration system. Accordingly, the filtration system 100 can be adapted, configured or altered to best suit the locality of the aquaculture facility in question.

Also shown in the present embodiment, the third filtration stage 130 occupies two cells of the filtration system 100, namely, a third cell denoted using reference numeral 130-1 and a fourth cell denoted using reference numeral 130-2. A third transfer conduit can be provided to facilitate flow of water between the third cell 130-1 and the fourth cell 130-2. The fourth cell 130-2 also contains bivalves to provide further removal of algal cells and thereby contaminants. The direction of fluid flow is shown by the directional arrow indicated using reference numeral 134-2. Both of the third cell 130-1 and fourth cell 130-2 provide removal of contaminants present in algal cells, effectively providing a clarification process similar to processes seen in drinking water treatment. The filtered water can then exit the filtration system 100 at an outlet 150, intending to provide the cultured fish and seafood land-based quality water with the benefits of the open-pen design (i.e. reduced cost, energy use, and carbon footprint). Additional cells containing bivalves may further be included as desired. However, it is also contemplated that a single cell containing bivalves may be sufficient to obtain the desired level of filtration. During operation of the filtration system 100, water undergoing filtration may be recirculated back to an earlier or "upstream" position. For example, in the embodiment depicted in FIG. 1, a recirculation process is implemented to recirculate a portion of the water in the fourth cell 130-2 of the third filtration stage 130 back to the third cell 130-1 of the same stage. Recirculation can be accomplished by pumping the water in the fourth cell 130-2 through a recirculation conduit 136 back to the third cell 130-1. In the exemplary embodiment, the flow rate may vary between 240 gallons per hour (GPH) and 1000 GPH. This recirculation process may be implemented to ensure algal cell removal by the bivalve compartments. Water undergoing treatment can be actively pumped between these two cells to ensure that wastewater is moving through each cell as intended.

In some implementations, a second recirculation path via a second recirculation conduit 140 is also provided, as shown in FIG. 1. This recirculation path takes water being treated in the fourth cell 130-2 of the third filtration stage 130 back to the second cell of the second filtration stage 120.

In other embodiments, the same filtration system 100 can also be used or configured to filter excrement/effluent created by a fish farm. The wastewater enters the first filtration stage 110 and can be screened for large particulates. Subsequently, nitrogenous compounds and phosphates can be utilized by the algae in the second filtration stage 120. Bivalves in the third filtration stage 130 can in turn ingest these algae and remove excess nitrogen and phosphorous from the water column, before the water is expelled into the surrounding waters at the outlet 150. Alternatively, in some embodiments, water leaving the outlet 150 may be directed to a second filtration system with the same or different configuration for further filtration.

Generally, any bivalve/algae combinations can be used with the filtration system 100 of the present disclosure. In an example embodiment for the North Atlantic marine market, 2 L of the algal species *Isochrysis* sp. and 200 *Mytilus edulis* may be used. These species and their quantities were determined through several lab tests during the prototype phase to ensure the ratio of algae:bivalve was appropriate for the target of 95% nitrogenous waste removal. While *Isochrysis* sp. and *Mytilus edulis* may be present in the example embodiment, the species may change based on the location of biofilters to ensure optimal conditions (i.e., temperature, salinity) for the filtration efficiency of the algae/bivalves. This will also ensure there is no risk of introducing an invasive or non-native species in the unlikely scenario of an escape.

As understood from the disclosure, the combination of algae and bivalve is usable to remove the microplastics and nitrogenous waste from their surrounding aquatic environment. Therefore, as long as a bivalve species can obtain the required nutrients from consuming the algae, the filtration system 100 can function. Accordingly, the above-described system can be functional with a minimum of two cells to accommodate the algae and the bivalve for water treatment. Additional cells can be introduced as required for redundancy or desired treatment outcomes. For example, cells containing filtering meshes can be added.

The inventors have found that macro algae (*Ulva*) may be used as a nutrient source for the bivalves. Furthermore, phytoplankton can be used as well. For example, in Atlantic Canada, phytoplankton can be sourced from the Dalhousie Aquatron, the NRC Marine Research Station in Ketch Harbour, Acadian Seaplants, and other local sources. Sourcing the bivalves and phytoplankton cultures from the local sources establishes a template known as the Biofilter Method Template (BMT). The inventors have developed this template to simplify the acquisition/selection of bivalve and algal species used for the filtration system 100. The BMT is a process that mimics the water clarifying relationship found in nature between bivalve and algae species and exploits this relationship on applications within a mechanical filtration system or process. The BMT sets out algae and bivalve combinations, similar to the quantities/ratios of the aforementioned example embodiment for the North Atlantic marine market, that cohabit within an ecosystem at a given location, which meet certain characteristics and suggests suitability of use in the filtration system 100. An example of such criteria include the bivalve siphoning rate and range, bivalve survivability against a pump, bivalve lifespan, algae coagulation with nitrogen and ammonia and algae coagulation with particulate. Using the BMT to source suitable localized combinations of bivalves and algae allows mimicry of the natural filtering relationship between bivalves and algae within the filtration system 100 and expedites the location-based sourcing/selection of species. In one example combination, the inventors have found that locally sourced phytoplankton is nutritious and suitable for use with American Oysters utilized in a deployment in Atlantic Canada. Moreover, the phytoplankton is capable of coagulating nitrogen and ammonia.

Figure 2:
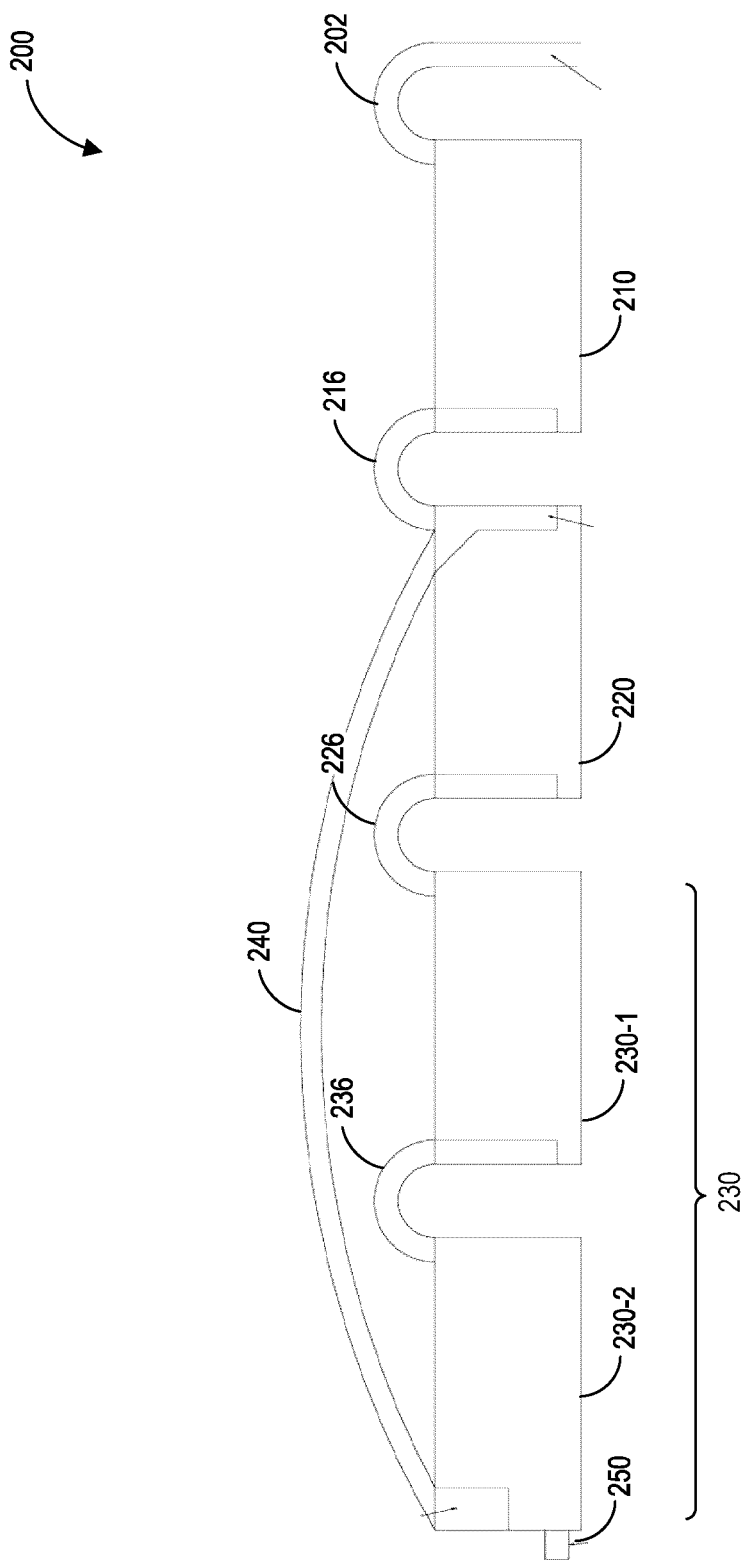
FIG. 2 is a schematic diagram of a water filtration system according to another embodiment.

BMT can be applied to any area in the world at which deployment of the filtration system 100 is desired. Preference is given to locating species that are able to filter out a high amount of particulates in their local aquatic environments. Phytoplankton that are able to coagulate the greatest number of particulates, such as microplastics, furans, dioxins, nitrogen, phosphorus and other particularly hazardous substances (PHS) may also be taken into consideration. The BMT provides the necessary dynamism to situate the filtration system 100. Therefore, application of BMT allows the acquisition of bivalves from local aquaculture facilities around the world, allowing any operator of the filtration system 100 to operate globally without the fear of introducing foreign and potentially invasive species into the local ecosystems. Testing can be conducted on combinations of local algae and bivalve species to determine their filtration rates or the rate at which the bivalves and algae can "process" or ingest undesired particulates in the water to obtain a given level of water purity. This assessment can be used to determine their ability to filter out particulates and thus their viability for use in the filtration system 100 as well as the operating conditions (e.g. water flow rates, temperature, aeration, etc.) required by the algae bivalve combination to obtain optimal filtration performance. Optical spectrometry can be used in the testing procedure to assess reduction in wastewater turbidity (i.e. increase in water clarity as a result of particulates being reduced) as a function of time. A control sample can be taken containing the phytoplankton/algae culture. Another sample can be taken after a given period of time to determine the change in turbidity. This assessment allows an operator to determine the filtration rate of a given bivalve and algae combination. In other embodiments, the filtration system 100 may be configured to comprise of three compartments or cells linked together with suitable tubing (not shown). The flow of water can be driven at least in part using gravity and at least partially using a pump. The first compartment may be configured to receive wastewater laden with microplastics. Such water can be flowed through an inorganic mesh filter positioned above a base of the compartment to sieve out the larger microplastics using gravity. This sieved water can be collected in a second cell or compartment for comparison against original input water and then pumped through to a third cell or compartment. This third compartment may be filled with bivalves, and the water allowed to sit for a residency time, where the bivalves may siphon out any remaining microplastic particles not caught by the inorganic mesh. In one implementation, Quahog clam, (formally known as the *Mercenaria mercenaria*) are used to provide clarification under duress of pumped water. Testing at different flow velocities, water temperatures, and volumes can be performed to determine optimal parameters for the species to provide clarification. Another embodiment of the filtration system may include four compartments comprising four large bins arranged in a linear sequence as opposed to the combination of gravity feeding and pumping used in the previous embodiment. FIG. 2 shows a depiction of the linearly configured filtration system 200. Corresponding elements found in the filtration system 100 of FIG. 1 are similarly numbered. Water enters the filtration system via an inlet 202 and into a first compartment corresponding to a first filtration stage 210. A corresponding sieve filter (not shown) may be provided inside the first filtration stage 210 to filter out large particulate matter. The water then moves to a second compartment corresponding to a second filtration stage 220 via a first transfer conduit 216 for agglomeration or coagulation of the contaminants before being passed onto third and fourth compartments 230-1 and 230-2, respectively corresponding to a third filtering stage 230, via transfer conduits 226 and 236. A recirculation conduit 240 may also be provided to recirculate water from the third filtration stage 230 to the second filtration stage 220. Filtered water exits an outlet 250 disposed at the fourth compartment 230-2.

Figure 3B:
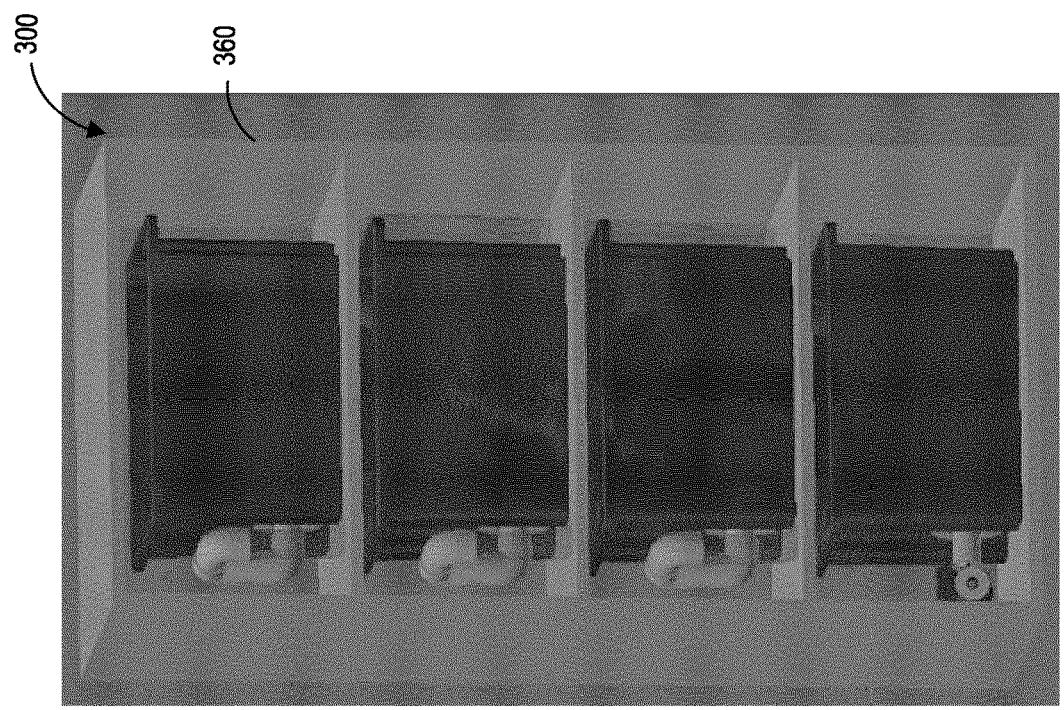
FIGS. 3A and 3B (collectively, FIG. 3) is a perspective view of a vertically stacked filtration system according to another embodiment.
Figure 3A:
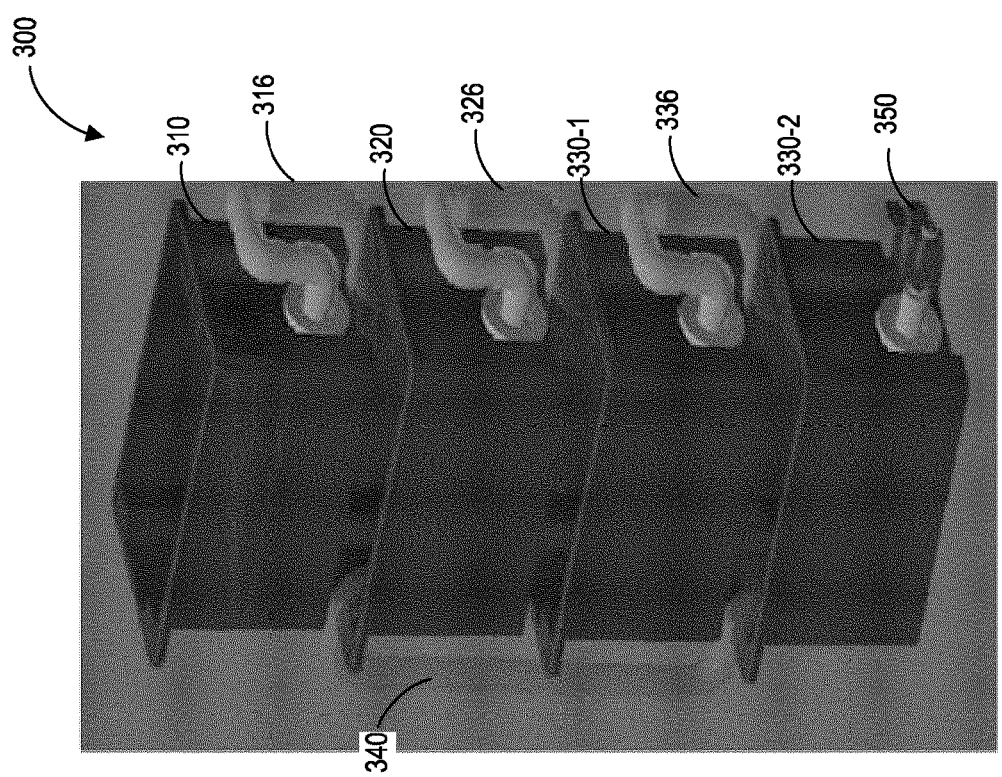

The configuration of the present embodiment of FIG. 2 may be operable to process wastewater at a larger scale (i.e. greater volume for a given period of time). Additional connections can be added for recirculating water between compartments to maximize filtration. Similar to the filtration system described above, an inorganic mesh filter may be used in the first filtration stage for filtering physically larger particles. The last two compartments of the four-compartment system may be used to house local bivalve molluscs to siphon smaller particles from the water. Additional compartments 220 can be added to house additional algae for further biofiltration, implemented in parallel between the mesh filtration compartment 210 and before the first compartment containing bivalves 230-1. FIG. 3A shows another embodiment of a filtration system 300 in a vertically stacked configuration, in which each of the containers corresponding to compartments or cells are stacked in a vertical arrangement. Corresponding elements found in the filtration systems 100 and 200 of FIGS. 1 and 2 are similarly numbered. Wastewater enters the filtration system via an inlet (not shown) and into a first compartment corresponding to a first filtration stage 310. A corresponding sieve filter (not shown) may be provided inside the first filtration stage 310 to filter out large particulate matter. Additionally, or alternatively, a particulate filter (not shown) may be included inside the first stage 310 to remove particulate. The wastewater then moves to a second compartment corresponding to a second filtration stage 320 via a first transfer conduit 316 for agglomeration or coagulation of the particulates and contaminants before being passed onto the third and fourth compartments 330-1 and 330-2, respectively, corresponding to the third filtering stage 330, via transfer conduits 326 and 336. The vertical arrangement of the compartments in this embodiment allows wastewater to flow between the compartments without additional pumping. A recirculation conduit 340 may also be provided to recirculate wastewater, by means of pumping, from the third filtration stage 330 to the second filtration stage 320. Filtered water exits an outlet 350 disposed at the fourth compartment 330-2. In some embodiments, the compartment 320 may be fitted with LED grow lights and mechanical aerators, which provide adequate luminosity and aeration, respectively, to promote algal growth. The aerators also serve to mix and agitate the wastewater, inhibiting biofouling. In some embodiments, the wastewater from the outlet 350 may be directed through additional filtration stages using different filtration technologies, such that the described filtration system is used to complement other commonly available filtration systems. FIG. 3B shows an alternative configuration in which each filtration compartment is provided on a shelf 360.

The following example is provided to further illustrate embodiments of the invention. The example is illustrative only, and is not intended to limit the scope of the invention in any way.

Example 1

Figure 4:
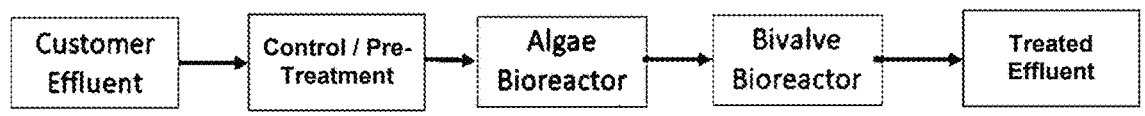
FIG. 4 is a process flow diagram of the bio-filtration process used in experiments described herein.

To determine if a bio-utilization process can remove nutrients from aquaculture effluent, a series of experiments were conducted. The schematic diagram shown in FIG. 4 provides the process flow diagram for the experiments conducted in this study. Experiments were conducted at a bench-scale to determine (1) viability of the bio-utilization process, (2) optimal flow rates and detention times in the bioreactors and (3) optimal bioreactor conditions and species for enhanced removal of nitrogen and phosphorus.

Figure 5:
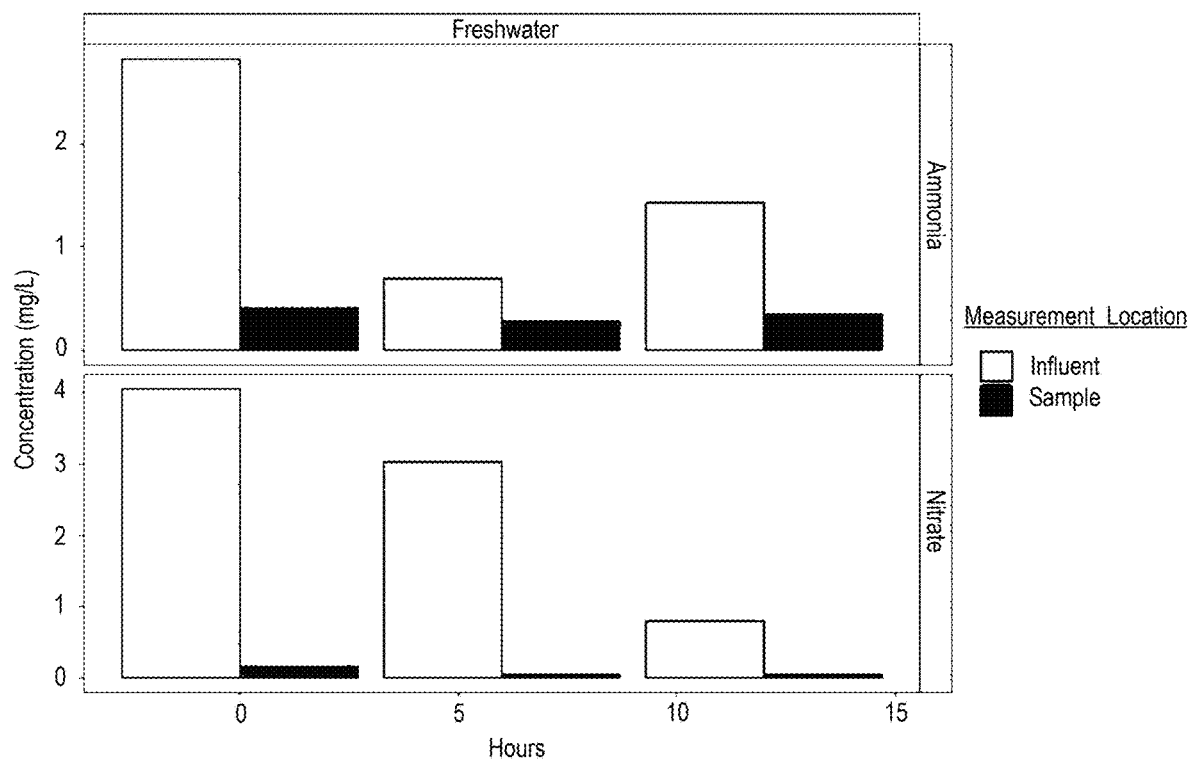
FIG. 5 is a table showing results of an experiment conducted in accordance with the the FIG. 4 process flow diagram.

An initial experiment to assess viability of the process was conducted using a benchtop bio-filter unit using aquaculture effluent from local Nova Scotia hatchery. Samples were taken at the inlet, outlet, in the algal chamber and in the bivalve chamber to determine where and how much removal of nitrogenous and phosphorus occurs in the bio-filter system. The experiment was conducted with both saltwater and freshwater algae and bivalve species and corresponding influent aquaculture wastewater. The results for the freshwater algae and bivalve species are set out in FIG. 5, which shows the concentration of ammonia and nitrate in mg/L over time as compared between influence water and sample tested.

To further evaluate bio-filter processes, a series of experimental runs were performed to determine the optimal combinations of flow rate and detention time in the algal chamber. Using the volume of the bench-scale algal chamber, and delineated detention times of 6 hours, 1 day, and 2 days, three corresponding flow rates were calculated and used for experimentation. The purpose of this experiment was twofold: (1) to determine which detention times provided the best nitrogen and phosphorus removal and (2) to use the data from this experiment to calculate the size of a full scale biofilter for aquaculture facilities based on flow rate data collected from hatcheries in Nova Scotia.

Samples were collected using the following procedures. For the first 6 hours of experimentation with all three detention times, samples were collected in 2 hour increments in four different locations: the influent wastewater, the algal chamber, the bivalve chamber and the effluent from the system. For detention times greater than 6 hours, the sampling increment was increased to every 6 hours over the first day and then to 12 hours for the final day. Samples were taken in duplicate and stored according to the US EPA guidelines for sample storage.

While attempting to optimize the flow rate and residency time, a wild-type polyculture sourced from McGowan Lake was utilized. To evaluate the efficacy of this wild-type polyculture, *Chlorella* sp. was selected as a monoculture to test. *Chlorella* sp. was selected for comparison due to the breadth of research done on *Chlorella* and its reputation as a hardy and fast growing group of freshwater algae. To evaluate the efficiency of using *Chlorella* versus the wild-type polyculture, two separate runs of the benchtop design from FIG. 4 were set up, one with the algal bioreactor seeded with *Chlorella* sp. and a second with a high concentration of the wildtype polyculture from McGowan Lake. Each test was performed using a retention time of two days, flow rate 0.026 L/min to observe each species ability to remove phosphorus and nitrogenous waste as well as their effect on the systems effect on other water quality metrics: pH, BOD, COD, and TSS. Both tests were run using wastewater collected from Cape Breton's Provincial Hatchery, and a negative control of untreated wastewater was collected for each barrel utilized.

Similar to the previous 2 day test, samples were collected every 2 hours during the first 8 hours of the detection period, every 6 hours for the next 18 hours, and every 12 hours for the last 24 hours of each of the two tests. Samples were collected in duplicate at each step of treatment within our benchtop system: wastewater influent, the algae bioreactor, the bivalve bioreactor, and the treated effluent. These samples were stored according to the US EPA guidelines for sample storage. Chemical analysis was outsourced to the Centre for Water and Resource Studies at Dalhousie university.

Over the course of each experiment, water quality samples were taken at least in duplicate and triplicate where possible.

Water samples were tested with a colorimeter for nitrate-N ($NO_3$—N) and ammonium-N ($NH_4$—N) concentrations using a Bran and Luebbe AutoAnalyzer III (Seal Analytical Inc., Mequon, WI, USA) at the Dalhousie University Innovative Waste Management laboratory.

The examples and corresponding diagrams used herein are for illustrative purposes only. Different configurations and terminology can be used without departing from the principles expressed herein.

Although the invention has been described with reference to certain specific embodiments, various modifications thereof will be apparent to those skilled in the art without departing from the scope of the invention. The scope of the claims should not be limited by the illustrative embodiments set forth in the examples, but should be given the broadest interpretation consistent with the description as a whole.

LIST OF REFERENCES

Cauwenberghe L V, Janssen C R. 2014. Microplastics in bivalves cultured for human consumption. Environmental Pollution 193:65-70.

Gifford S, Dunstan R, Oconnor W, Roberts T, Toia R. 2004. Pearl aquaculture—profitable environmental remediation? Science of The Total Environment 319: 27-37.

IntraFish. 2018. Land-based salmon farming Aquaculture's new reality.

Webb J L, Vandenbor J, Pirie B, Robinson S M, Cross S F, Jones S R, Pearce C M. 2013. Effects of temperature, diet, and bivalve size on the ingestion of sea lice (*Lepeophtheirus salmonis*) larvae by various filter-feeding shellfish. Aquaculture 406-407:9-17.

The invention claimed is:

1. A multistage water filtration system for removing particulate waste and biochemical waste from input water, the system comprising:
    a water inlet for receiving the input water;
    a first compartment in fluid communication with the water inlet, the first compartment containing algae in liquid suspension, the algae being usable to agglomerate to the waste in the input water to form algal particulates;
    a second compartment located downstream of the first compartment for receiving the water and the algal particulates from the first compartment through a first forward fluid transfer conduit, the second compartment containing bivalves usable to siphon a portion of the algal particulates from the water received from the first compartment, leaving remainder algal particulates in the water;
    a third compartment located downstream of the second compartment for receiving the water and the remainder algal particulates from the second compartment through a second forward fluid transfer conduit, the third compartment containing bivalves usable to siphon the remainder algal particulates from the water received from the second compartment to produce filtered water;
    a first fluid recirculation conduit to recirculate a portion of the water and the remainder algal particulates from the third compartment to the first compartment;
    a second fluid recirculation conduit to recirculate a portion of the water and the remainder algal particulates from the third compartment to the second compartment; and
    a water outlet in fluid communication with the third compartment for egressing the filtered water from the multistage filtration system.

2. The water filtration system of claim 1 comprising a fourth compartment located between the water inlet and the first compartment, the fourth compartment containing a filter for removing a portion of the particulate waste from the input water to produce pre-treated water, the pre-treated water for delivery to the first compartment.

3. A method of filtering input water to remove particulate waste and biochemical waste therefrom, the method comprising:
    receiving the input water through a water inlet;
    directing the input water to a first filter containing algae in liquid suspension, wherein the algae in the first filter agglomerates to the particulate waste and biochemical waste in the input water to form algal particulates;
    directing the water and algal particulates from the first filter through a first forward fluid transfer conduit to a second filter containing bivalves usable to siphon a portion of the algal particulate particulates from the water, leaving remainder algal particulates in the water;
    directing the water and the remainder algal particulates from the second filter through a second forward fluid transfer conduit to a third filter containing bivalves usable to siphon the remainder algal particulates from the water to produce filtered water;
    recirculating a portion of the water and the remainder algal particulates from the third filter to the first filter;
    recirculating a portion of the water and the remainder algal particulates from the third filter to the second filter; and
    egressing the filtered water through a water outlet.

4. The method of claim 3, comprising directing the input water containing the particulate waste and biochemical waste to a fourth filter for removing a portion of the particulate waste from the water to produce pre-treated water for delivery to the first filter.

5. A multistage water filtration system for removing particulate waste and biochemical waste from input water, the system comprising:
    a water inlet for receiving the input water;
    a first compartment in fluid communication with the water inlet, the first compartment containing algae in liquid suspension, the algae being usable to agglomerate to the waste in the input water to form algal particulates;
    a second compartment located downstream of the first compartment for receiving the water and the algal particulates from the first compartment through a first forward fluid transfer conduit, the second compartment containing bivalves usable to siphon a portion of the algal particulates from the water received from the first compartment, leaving remainder algal particulates in the water;
    a third compartment located downstream of the second compartment for receiving the water and the remainder algal particulates from the second compartment through a second forward fluid transfer conduit, the third compartment containing bivalves usable to siphon the remainder algal particulates from the water received from the second compartment to produce filtered water;
    a first fluid recirculation conduit to recirculate a portion of the water and the remainder algal particulates from the third compartment to the first compartment; and
    a water outlet in fluid communication with the third compartment for egressing the filtered water from the multistage filtration system, wherein the compartments are stacked in a vertical arrangement.

6. The water filtration system of claim 5, wherein the first compartment comprises at least one baffle structure to provide adhesion sites for the algae and to promote interaction between the algae and the waste within the first compartment.

7. The water filtration system of claim 6, wherein the algae and bivalve correspond to respective algae species and bivalve species local to a geographical location of the system.

8. The water filtration system of claim 7, wherein the algae species is nutritious for the bivalve species used in the filtration system.

9. The water filtration system of claim 7, wherein a selection of the algae and bivalve species is based on at least one of: (i) bivalve siphoning rate; (ii) bivalve siphoning range; (iii) bivalve survivability against a pump; (iv) bivalve lifespan; (v) algae agglomeration with nitrogen; (vi) algae agglomeration with ammonia; and (vii) algae agglomeration with the particulate waste.

10. The water filtration system of claim 6, wherein the bivalves are one of *Crassostrea virginica* and *Mytilus edulis*, and the algae is one of phytoplankton and *Isochrysis* sp.

11. A method of filtering input water to remove particulate waste and biochemical waste therefrom, the method comprising:
   receiving the input water through a water inlet;
   directing the input water to a first filter containing algae in liquid suspension, wherein the algae in the first filter agglomerates to the particulate waste and biochemical waste in the input water to form algal particulates;
   directing the water and algal particulates from the first filter through a first forward fluid transfer conduit to a second filter containing bivalves usable to siphon a portion of the algal particulate particulates from the water, leaving remainder algal particulates in the water;
   directing the water and the remainder algal particulates from the second filter through a second forward fluid transfer conduit to a third filter containing bivalves usable to siphon the remainder algal particulates from the water to produce filtered water;
   recirculating a portion of the water and the remainder algal particulates from the third filter to the first filter; and
   egressing the filtered water through a water outlet,
   wherein the filters are contained in compartments stacked in a vertical arrangement.

12. The method of claim 11, wherein a first compartment containing the first filter comprises at least one baffle structure to provide adhesion sites for the algae and to promote interaction between the algae and the waste within the first compartment.

13. The method of claim 12, wherein the algae and bivalve correspond to a respective algae species and bivalve species combination local to a geographical location of the first filter and second filter.

14. The method of claim 13, wherein the algae species is nutritious for the bivalve species.

15. The method of claim 13 comprising selecting the algae and bivalve species based on at least one of: (i) bivalve siphoning rate; (ii) bivalve siphoning range; (iii) bivalve survivability against a pump; (iv) bivalve lifespan; (v) algae agglomeration with nitrogen; (vi) algae agglomeration with ammonia; and (vii) algae agglomeration with the particulate waste.

16. The method of claim 12, wherein the bivalves are one of *Crassostrea virginica* and *Mytilus edulis*, and the algae is one of phytoplankton and *Isochrysis* sp.

* * * * *